Nov. 27, 1923.
M. HARLOE
RESILIENT WHEEL
Filed Oct. 29, 1920
1,475,488
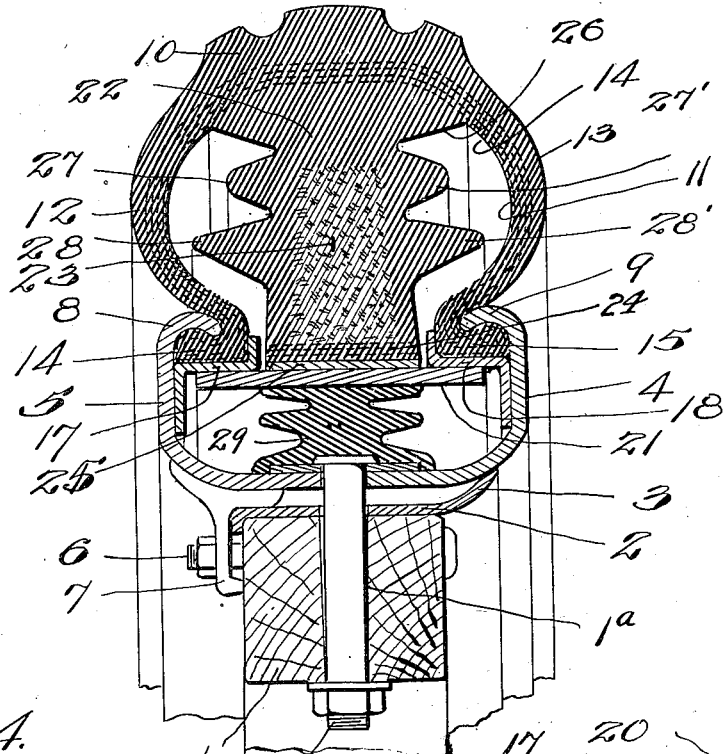
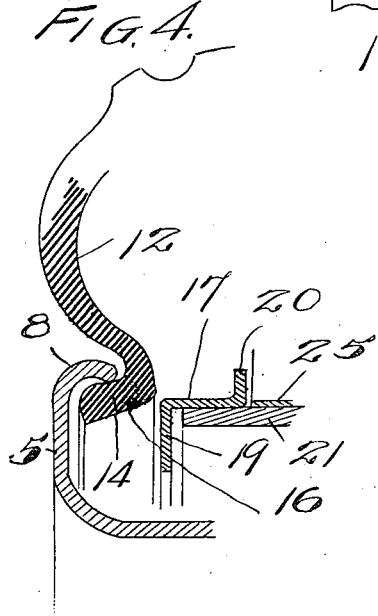
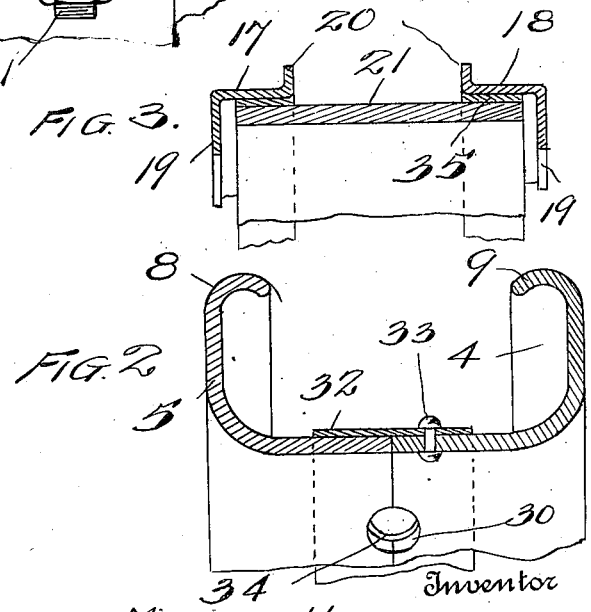
Inventor
MORTON HARLOE
Chas. K. Davies
Attorney Patented Nov. 27, 1923.

1,475,488

UNITED STATES PATENT OFFICE.

MORTON HARLOE, OF WINCHESTER, VIRGINIA, ASSIGNOR TO THE HARLOE TIRE COMPANY, INC., OF WINCHESTER, VIRGINIA.

RESILIENT WHEEL.

Application filed October 29, 1920. Serial No. 420,342.

*To all whom it may concern:*

Be it known that I, MORTON HARLOE, a citizen of the United States, residing at Winchester, in the county of Frederick and State of Virginia, have invented certain new and useful Improvements in Resilient Wheels, of which the following is a full, clear, and exact description, reference being had to the accompanying drawings, forming a part thereof.

The present invention relates particularly to improvements to tires of wheels for automobiles, trucks, and other vehicles and is designed to provide a durable, strong and comparatively inexpensive tire construction of this type for receiving and gradually absorbing the strains from a loaded vehicle, and for absorbing shocks and jerks in traveling due to irregularities in the road, and from other causes, thus reducing the wear and vibrations otherwise present in the frame or body of the vehicle.

The invention consists in certain novel combinations and arrangements of parts comprising the flexible tire casing and interiorly arranged cushioning means and compression members for absorbing movement, under load, of the tire casing, due to weights thereon. Specifically the invention resides in the novel construction of cushion within the tire casing, in the peculiar association of parts for retaining the side walls of the casing in stable position with relation to the rim and felloe of the wheel, and in the auxiliary cushioning means adapted especially for supporting heavy loads imposed upon trucks and other commercial vehicles, and further the invention consists in certain details of construction as will be hereinafter more fully set forth and claimed.

In the accompanying drawings I have illustrated one complete example of the physical embodiment of my invention, and a slight modification thereof, in which the parts are combined and arranged according to the best mode I have thus far devised for the practical application of the principles of my invention.

As many changes could be made in the construction illustrated, and many apparently widely different improvements of this invention could be made without departing from the scope thereof, it is intended that all matter contained in the following description, or shown in the accompanying drawings shall be considered as illustrative and not in a limiting sense. It is also to be understood that the language used in the appended claims is intended to cover all of the generic and specific features of the invention herein described, and all statements of the scope of the invention, which, as a matter of language might be said to fall therebetween.

Figure 1 is a transverse sectional view through the wheel tire, felly, rim, and other parts, showing the embodiment of my invention, wherein the opening of the felly usually adapted to receive the valve and cap for a pneumatic-tire wheel is utilized for an anchoring bolt to prevent circumferential movement of the present tire on the felly.

Figure 2 is a transverse sectional view of the sectional hollow rim, detached, showing the guide band or annular shield in the interior of the hollow rim, and an opening or orifice in the rim and band for the anchoring bolt.

Figure 3 is a transverse sectional detail view showing a modification of the construction employing a pair of filler hoops between the retaining rings and the master spring within the hollow rim.

Figure 4 is a detail sectional view of a part of the tire illustrating the manner of assembling the tire parts.

In the preferred form of the invention as depicted in the drawings I have illustrated the usual form of wood felly 1 having the customary opening or orifice 1ª passing therethrough which is used on pneumatic-tire wheels for the accommodation of the pneumatic valve and its cap, and the well known form of metallic band 2 which is shrunk upon the wood felly. Thus it will be apparent that the tire of the invention is adaptable for use with the standard form of felloes for pneumatic tires and wheels, or if desired special forms of felloes may be utilized in connection with the invention.

The felloe band 2 is provided with the usual side flange 3, which co-acts with the complementary sections 4 and 5 of the hollow rim, and the long bolts 6 spaced around the tire and passing through the wood felloe, are passed through the dogs or lugs 7, to clinch or clamp the sectional rim between the dogs and the flange 3, and in this manner form a rigid but demountable rim construction on the felloe.

The two rim sections 4 and 5 are each fashioned with circumferential or annular curved flanges as 8 and 9, which are integral with the sections and turned over to project inwardly and form abutment flanges for the rim sections as shown.

The tire casing may be of standard or other acceptable form and is fashioned with its outer or tread portion 10 of well known stock material, and an inner portion 11 of composition fabric material, while its side walls 12 and 13 terminate in broad beads 14 and 15. As seen in Figure 4 these annular beads are fashioned as integral members of the side walls of the casing being formed in molds with angular flat inner faces 16 thus providing a frusto-conical shape for the annulus formed by the beads. This is the normal shape of the beads when leaving the molds and as unrestrained, and the special angular formation with regard to the side walls provides for a ready and facile withdrawal of the mold sections when the casing is formed. The material of the side walls and of their beads is resilient, and it will be apparent that these beads may be forced into horizontal position, or perpendicular to the radial axis of the wheel tire, as in Figure 1, and retained in such position when the tire is assembled on the wheel or its felloe.

The beads are retained in proper position by the curved flanges 8 and 9 of the sectional rim in connection with a pair of complementary, somewhat Z shape rings 17 and 18, each of which comprises a flat body and an inwardly projecting, annular, outer flange 19, and an outwardly projecting, inner flange 20. This body and its flanges provide a rigid or non-flexible retaining and guide ring, one at each side of the tire, for the beads at the edges of the side walls of the casing.

The function of these beads will be apparent in Figure 1 where the beads are shown as inclosed between the respective flanges of the rim sections and the flanges of the retaining rings, the flat faces 16 of the beads resting upon the flat bodies of the retaining rings which thus form a wide base or support for the side walls of the casing. By this simple arrangement of a minimum number of parts the beads of the side walls are effectually retained in position and supported, and lateral displacement prevented, thus rigidly holding the beads forming the base of the side walls with relation to the flexible part of the casing. The outer flanges 19 of the interior retaining rings lie parallel to and in contact with the inner faces of the walls of the rim sections, and the inner flanges 20 of these rings hold the beads in stable position, thus permitting the required flexure of the tire casing, under load on the wheel, but retaining the beads of the side walls in relatively fixed position.

The flat bodies 17 of the retaining rings extend inwardly toward the radial center of the sectional rim, and within the rim a spring 21 is retained by these two rings 17 and 18. The master spring 21 is an integral, annular resilient band of steel of sufficient width to close the rim opening between the two retaining rings, with its edges extending laterally under the flat bodies of the retaining rings and of adequate tensile strength to support the load imposed thereon.

The master spring does not have a driving fit within the rings 17 and 18, but has a sufficiently loose fit therein to permit a slight deformation or spreading under the weight of a load within the rings, causing the spring to engage the rings over their circumferential area.

The interior of the tire casing is fashioned with an annular cushion member of live rubber, forming a central web 22 in which is enclosed a core 23, made up of granulated cork, or other similar material, closely compacted in a mold and cemented together into a homogenous mass or structure. This structure forms a comparatively light, resilient and strong filler, inexpensive of production, durable, and an integral part of the web, which reduces the cost of production and weight of the web and adds to its efficiency. The inner base of the web is reinforced, as at 24 with fabric or cord, and a metallic pier ring 25, which is resilient, forms the base or wear ring for the web. The base ring surrounds, and is in close frictional contact with the master spring 21, which latter is enclosed in the hollow rim as described.

The annular web or pier of the casing has its base located between the complementary flanges 20 of the retaining rings and the web is thus confined to central position, and held against excessive or undue lateral displacement.

It will be noted that the beads 14 and 15 of the side walls of the casing have a substantial and wide solid support on the transverse non-flexible flat bodies of the retaining rings, in order that the load of compression on the tire casing may be received before the movement of compression is transmitted to the central cushion pier or web. The flexibility of the tire casing permits an upward movement of the tread portion, when bearing a sufficient load, and this movement if great enough, is transmitted through the rubber cushion to the pier. To provide for a gradual absorption of the load by the pier, before the weight of the load is imposed on the master spring 21 I utilize a novel construction at the sides of the web or pier within the casing. For this purpose the cushion member of the casing is provided with lateral oblique walls 26, 26, each side of the radial center, and the web is fashioned with laterally projecting ribs 27 27' and 28 28', the latter being under and wider than the former, and both pairs of ribs having oblique faces and angular or wedge shaped in cross section as shown in Figure 1. Now it will be apparent that as the load is imposed on the tire casing and absorbed by the cushion, this fluted construction at the sides of the web will assist in gradually absorbing the movement, with an increased resistance to the movement of the flexing tire casing. Thus, the initial flexing movement of the tread portion of the tire causes the oblique faces 26 of the cushion to gradually contact with the oblique faces at the outer sides of the ribs 27 27', the resistance to the load increasing as the line of contact between these two surfaces increases. The continued flexing of the tire causes the inner oblique faces of the ribs 27 27' to gradually contact with the outer oblique faces of the ribs 28 28', and finally the inner oblique faces of the ribs 28 28' are caused to contact with the inner faces of the side walls of the casing near their beads, thus gradually absorbing the movement with an increased and continuously increasing resistance, until the movement of flexure is imposed on the master spring 21. Thus the weight of the load is gradually absorbed by the inner web or pier of the casing and the pier is compressed and the casing flexed as the load is transmitted to the resilient master spring and there absorbed. The master spring is of course of less resiliency than the web or pier, and comparatively light loads will cause a movement of the tire casing that may be absorbed by the cushion member before reaching the base of the pier and the master spring. But under heavier loads, the greater compression movement of the tire casing is transmitted through the rubber casing, the flexible fabric and cushion pier, the pier ring and finally the master spring or band 21. To absorb excessive loads imposed on the tire, as when the tire is used on the wheels of trucks or industrial or commercial vehicles, I utilize an auxiliary, centrally arranged rubber cushion 29 between the master spring and the sectional rim, and preferably this cushion is fluted at its sides as indicated in Figure 1, whereby the movement of flexure is gradually absorbed and the resistance of the cushion gradually and continuously increased.

The hollow rim is preferably fashioned in a single integral piece, and pierced at 30 to accommodate the anchoring bolt 31 which is passed through the felloe and this orifice in the rim. After the orifice has been formed in the rim, the latter is sheared into two sections, the line of cut extending circumferentially around the rim at its center and passing diametrically through the orifice 30. Thus the two sections 4 and 5 are formed in pairs and are afterward used as mates in the tire construction. To hold the two sections in alinement I may employ a metal ring 32, which may be riveted as at 33 to one of the sections, with its opposite edge overlapping the complementary section, and this ring 32 is provided with an opening 34 registering with the orifice 30 of the rim for the bolt 31. The anchoring bolt holds the rim and its band against circumferential slipping or movement on the felloe. To take up wear, or to insure a close fit between the retaining rings 17 18 and the master spring I may use the thin annular fillers 35, 35 indicated in Figure 3.

In Figure 4 the manner of procedure for assembling the tire parts is illustrated, and it will be apparent that after the ring 17 has been slipped over the edge of the master spring, the bead of the side wall 12 may be forced into place, with the face 16 passing over the edge of the ring 17, as pressure is applied to the rim section 5, the curved flange 8 forcing the bead into horizontal alinement on the retaining ring.

Having thus fully described my invention, what I claim is—

1. The combination with a sectional rim, of a flexible tire casing having side walls and beads, retaining rings within said rim supporting said side walls, a master spring within these rings, and an annular resilient cushion in the casing supported on said spring.

2. The combination with a sectional rim having annular retaining flanges, of a flexible tire casing having side walls and beads beneath said flanges, retaining rings within said rim supporting said beads, a master spring within the retaining rings, and an annular resilient cushion in the casing supported on said spring.

3. The combination with a hollow rim having annular retaining flanges and an open center, of a flexible tire casing having side walls and beads beneath said flanges, spaced rings in said rim supporting said beads and fashioned with retaining flanges, a master spring within the retaining rings, and an integral annular cushion in the casing supported on said spring.

4. The combination with a hollow sectional rim, of a tire casing having flexible walls and beads thereon, spaced rings forming rigid supports for said walls and beads, retaining flanges on said sectional rim for said beads, an annular spring within the rim, an integral resilient web within said casing having laterally extending ribs adapted to gradually increase the resistance of said web as the load increases on the tire casing.

MORTON HARLOE.